US009786391B2

(12) United States Patent
Pappano et al.

(10) Patent No.: US 9,786,391 B2
(45) Date of Patent: *Oct. 10, 2017

(54) NUCLEAR FUEL PEBBLE AND METHOD OF MANUFACTURING THE SAME

(71) Applicant: X-Energy, LLC., Greenbelt, MD (US)

(72) Inventors: Peter Pappano, Poolesville, MD (US); Martin van Staden, Annapolis, MD (US)

(73) Assignee: X-ENERGY, LLC, Greenbelt, MD (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/044,747

(22) Filed: Feb. 16, 2016

(65) Prior Publication Data

US 2016/0247583 A1  Aug. 25, 2016

Related U.S. Application Data

(60) Provisional application No. 62/118,119, filed on Feb. 19, 2015, provisional application No. 62/249,579, filed on Nov. 2, 2015.

(51) Int. Cl.
*G21C 3/62* (2006.01)
*G21C 3/28* (2006.01)
(Continued)

(52) U.S. Cl.
CPC ............ *G21C 3/28* (2013.01); *B29C 67/0081* (2013.01); *G21C 1/07* (2013.01); *G21C 21/14* (2013.01);
(Continued)

(58) Field of Classification Search
CPC .......... G21C 21/02; G21C 21/14; G21C 3/28; G21C 3/42; G21C 3/58; G21C 3/62;
(Continued)

(56) References Cited

U.S. PATENT DOCUMENTS 3,212,989 A * 10/1965 Fitzer .................. G21C 3/04
376/411
3,586,746 A * 6/1971 Triggiani ............... G21C 21/02
376/411
(Continued)

FOREIGN PATENT DOCUMENTS

CN   202512905 U   10/2012
CN   202563900 U   11/2012
(Continued)

OTHER PUBLICATIONS

Pavelkova, J Radioanal Nucl Chem (2015) 304:245-250.*
(Continued)

*Primary Examiner* — Jack W Keith
*Assistant Examiner* — Daniel Wasil
(74) *Attorney, Agent, or Firm* — The Marbury Law Group, PLLC

(57) ABSTRACT

A method of manufacturing nuclear fuel elements may include: forming a graphite base portion of the fuel element; depositing a first layer of graphite spheres on the base portion; depositing a first layer of fuel, burnable poison and/or breeder particles on the first layer of graphite spheres; forming a second layer of graphite spheres on the first layer of particles; depositing a second layer of fuel, burnable poison and/or breeder particles on the second layer of graphite spheres; and forming a graphite cap portion of the fuel element. Fuel, burnable poison and/or breeder particles of the first layer may be are spaced apart by substantially the same distance, and fuel, burnable poison and/or breeder particles of the second layer may be spaced apart by substantially the same distance. The fuel element may be a spherical fuel pebble. The fuel particles may be tri-structural-isotropic (TRISO) particles without an overcoat.

18 Claims, 16 Drawing Sheets

(51) Int. Cl.
*G21C 21/14* (2006.01)
*G21C 1/07* (2006.01)
*B29C 67/00* (2017.01)
*B33Y 10/00* (2015.01)
*B33Y 80/00* (2015.01)

(52) U.S. Cl.
CPC ............... *B33Y 10/00* (2014.12); *B33Y 80/00* (2014.12); *G21C 3/62* (2013.01); *Y02E 30/36* (2013.01)

(58) Field of Classification Search
CPC .......... G21C 1/07; B33Y 10/00; B33Y 80/00; B29C 67/0081
USPC ............................... 376/411, 419, 430; 427/6
See application file for complete search history.

(56) References Cited

U.S. PATENT DOCUMENTS

| | | | |
|---|---|---|---|
| 3,855,061 A * | 12/1974 | Triggiani | G21C 21/02 |
| | | | 376/411 |
| 5,978,434 A | 11/1999 | Gerwin et al. | |
| 6,865,245 B2 | 3/2005 | Bazant | |
| 7,400,697 B1 | 7/2008 | Carmack et al. | |
| 7,403,585 B2 | 7/2008 | Ougouag et al. | |
| 7,666,463 B1 | 2/2010 | Youchison et al. | |
| 7,978,807 B2 | 7/2011 | Ikeda et al. | |
| 8,173,208 B2 * | 5/2012 | Pappano | C01B 31/04 |
| | | | 427/212 |
| 8,243,871 B2 | 8/2012 | Hrovat et al. | |
| 8,526,566 B1 | 9/2013 | Youchison et al. | |
| 8,744,036 B2 | 6/2014 | Peterson | |
| 8,817,940 B2 | 8/2014 | Finken | |
| 9,299,464 B2 | 3/2016 | Venneri et al. | |
| 2011/0091004 A1 * | 4/2011 | Farmer | G21B 1/01 |
| | | | 376/412 |
| 2012/0140867 A1 | 6/2012 | Venneri et al. | |
| 2014/0021085 A1 | 1/2014 | Temus et al. | |
| 2014/0203460 A1 * | 7/2014 | Lahoda | G21C 21/02 |
| | | | 264/0.5 |
| 2014/0307845 A1 | 10/2014 | Pop | |
| 2015/0170767 A1 * | 6/2015 | Venneri | G21C 3/04 |
| | | | 376/412 |

FOREIGN PATENT DOCUMENTS

| | | |
|---|---|---|
| CN | 103137226 A | 6/2013 |
| CN | 103762000 A | 4/2014 |
| CN | 103971771 A | 8/2014 |
| CN | 102623071 B | 9/2014 |
| CN | 104409109 A | 3/2015 |
| CN | 104575626 A | 4/2015 |
| CN | 103345948 B | 2/2016 |
| EP | 1756838 A1 | 2/2007 |
| EP | 2 455 944 A1 | 5/2012 |
| EP | 1 982 336 B1 | 4/2013 |
| FR | 2866978 A1 | 9/2005 |
| JP | 2005-195454 A | 7/2005 |
| KR | 100756440 B1 | 8/2007 |
| WO | 99/62074 A1 | 12/1999 |
| WO | 2005/091306 A1 | 9/2005 |
| WO | 2008/086033 A1 | 7/2008 |
| WO | 2013025625 A1 | 2/2013 |
| WO | 2015195115 A1 | 12/2015 |
| WO | WO 2015/200257 | * 12/2015 ............... G21C 3/02 |

OTHER PUBLICATIONS

International Search Report and the Written Opinion of the International Search Authority for International Application No. PCT/US2016/018500, dated Jul. 1, 2016.

* cited by examiner

| | | |
|---|---|---|
| DIAMETER OF THE SPHERES | cm | 6.0 |
| THICKNESS OF OUTER GRAPHITE SHELL | cm | 0.5 |
| DENSITY OF FUEL MATRIX AND SHELL | g/cm$^3$ | 1.74 |
| DIAMETER OF FUEL KERNELS | mm | 500 |
| DENSITY | g/cm$^3$ | 9.5 |
| MATERIAL OF COATINGS | | C / C / SiC / C |
| THICKNESS OF COATINGS | mm | 95 / 40 / 35 / 40 |
| DENSITIES | g/cm$^3$ | 1.05 / 1.90 / 3.18 / 1.90 |
| FUEL | | Th/U93% |
| HEAVY METAL LOADING | g/sphere | 20 |
| FRACTION OF COATED PARTICLES IN FUEL MATRIX | % | 22.8 |

FIG. 4
(Prior Art)

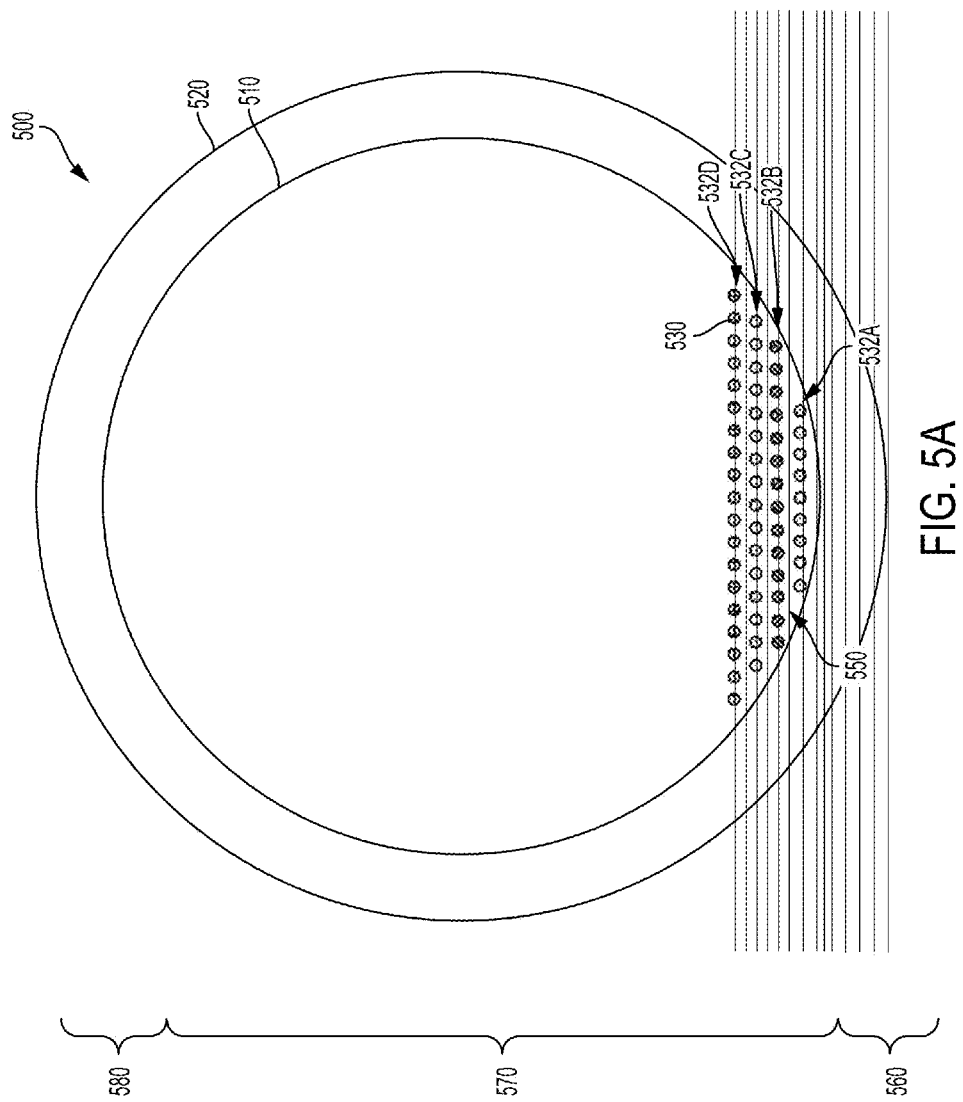

NUCLEAR FUEL PEBBLE AND METHOD OF MANUFACTURING THE SAME

RELATED APPLICATIONS

This application claims the benefit of priority to U.S. Provisional Application No. 62/118,119 entitled "NUCLEAR FUEL PEBBLE AND METHOD OF MANUFACTURING THE SAME" filed Feb. 19, 2015, and U.S. Provisional Application No. 62/249,579 entitled "NUCLEAR FUEL PEBBLE AND METHOD OF MANUFACTURING THE SAME" filed Nov. 2, 2015, the entire contents of both of which are incorporated herein by reference.

BACKGROUND

High temperature gas cooled reactors (HTGR) hold significant promise for highly efficient and inherently safe production of electrical power. HTGR designs typically feature fuel that is isolated within layers of graphite moderator, and is constructed with multiple physical barriers to minimize the potential for fission product release. Also, the negative temperature feedback reactivity characteristics of HTGR fuel results in automatic shutdown of the nuclear fission chain reaction when temperatures exceed safe levels. These inherent characteristics of HTGRs enable the design of inherently safe reactors that rely on minimal emergency core cooling systems.

One type of HTGR is known as a "pebble bed" reactor. In this HTGR design, fissionable fuel is encapsulated within multilayered ceramic particles that are themselves encapsulated within multi-layered graphite spheres, referred to as "pebbles." The spherical nature of the fuel pebbles enables gas to flow between the spheres for extracting heat from the reactor, while providing a core structure that is self assembling. Fuel pebbles are simply loaded into a cylindrically shaped core region that is formed by loosely packed graphite blocks that provide the structural support for the pebbles to remain in a randomly packed cylindrical shape. During refueling spent fuel can be removed simply by pebble unloading device which removes a single pebble at a time before feeding the spent fuel pebble to a spent fuel container using the force of gravity only. Fresh fuel pebbles are loaded into the top of the core barrel also using a gravity feed system.

SUMMARY

Exemplary embodiments provide methods of mass production manufacturing of fuel elements configured for use in a high-temperature gas cooled reactor (HTGR) core. The embodiment manufacturing methods may include forming fuel elements using additive manufacturing methods akin to three-dimensional (3D) printing methods that enable precision placement of fuel particles within a fuel zone of the fuel element structure. The embodiment methods enable efficient and high quality manufacturing of graphite-based fuel elements having a wide variety of shapes and sizes. One particular application of the embodiment methods is manufacturing spherical fuel elements, referred to as "pebbles," for use in pebble bed HTGR cores.

In a particular embodiment, a manufacturing method may include: forming a graphite base portion of the fuel element using 3D printing/additive manufacturing methods; forming a first graphite layer of graphite spheres on the base portion using 3D printing/additive manufacturing methods; depositing a first layer of fuel particles on the base portion using a first positioning chuck; forming a second graphite layer of graphite spheres on the base portion using 3D printing/additive manufacturing methods; depositing a second layer of fuel particles on the second graphite layer using a second positioning chuck; and forming a graphite cap portion of the fuel element and/or a final graphite layer using 3D printing/additive manufacturing methods, wherein the first positioning chuck places fuel particles in particular locations on the first layer spaced apart by substantially the same distance, and the second positioning chuck places fuel particles in particular locations of the second layer spaced apart by substantially the same distance and vertically offset from the positions of fuel particles in the first layer.

In some embodiments, the graphite base portion of a fuel pebble may be formed by sequentially forming layers of graphite with increasing radii using 3D printing/additive manufacturing techniques to form a portion of a sphere. In some embodiments, a fuel zone of a fuel pebble may be formed by repeatedly laying down layers including fuel particles in the manner of the first and second layers using 3D printing/additive manufacturing methods and position chucks of different geometries to form an approximately spherical fuel zone. In some embodiments, forming a graphite cap portion of the fuel pebble on the second graphite layer may be accomplished by forming a plurality of layers of incrementally smaller radii using 3D printing/additive manufacturing methods.

The various embodiments enable the use of tri-structural-isotropic (TRISO) fuel particles that do not have an overcoat in fuel elements. Exemplary embodiments include fuel elements (e.g., fuel pebbles) formed by the method summarized above.

Exemplary embodiments of the present disclosure provide a fuel pebble configured for use in a pebble bed high-temperature gas cooled reactor core, the fuel pebble comprising: layers of fuel particles; graphite layers disposed between the layers of fuel particles, wherein adjacent fuel particles of at least one of the layers of fuel particles are spaced apart from one another by substantially the same distance.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 4 is a table listing example configuration parameters for fuel pebbles and fuel particles suitable for use with the various embodiments.

FIG. 5A illustrates side sectional view of a fuel pebble according to various embodiments of the present disclosure.

DETAILED DESCRIPTION

Figure 1:
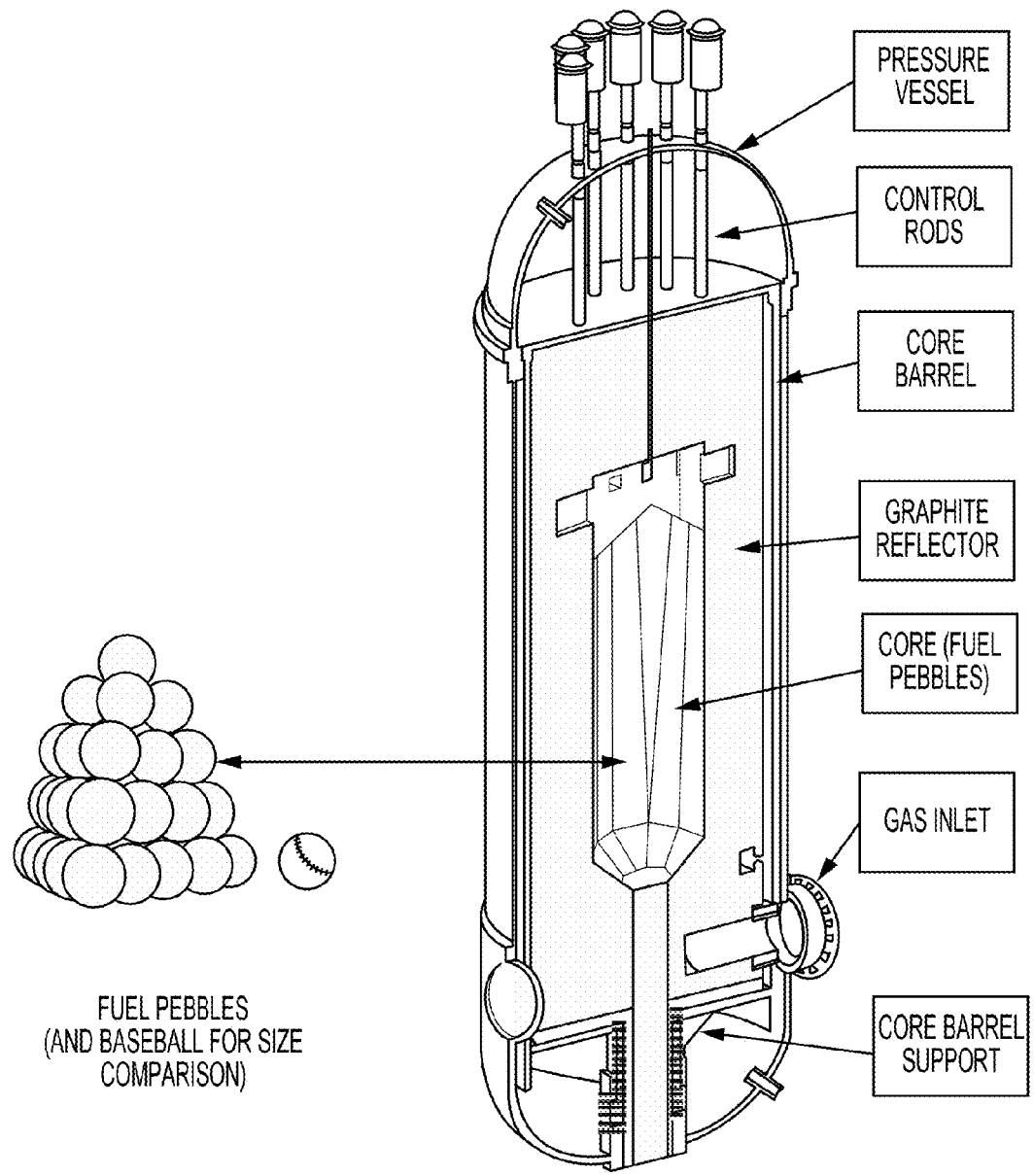
FIG. 1 is a cross-sectional view of a pebble bed high temperature gas cooled reactor suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide methods of mass production manufacturing of fuel elements for use in a high-temperature gas cooled reactor (HTGR) core that enable higher production rates, lower cost and higher quality than available in conventional manufacturing methods. Embodiment methods include forming fuel elements (e.g., fuel pebbles) using additive manufacturing methods, such as three-dimensional (3D) printing methods, and precision placement of particles of fuel, burnable poison and/or breeder materials within a fuel zone of the fuel element structure.

The particles placed in the fuel zone of fuel elements may include fuel (i.e., fissile) elements (e.g., U233, U235, Th231, and/or Pu239), breeder elements (e.g., U238 and Th232), burnable poisons (e.g., B, Hf, etc.), and combinations of fuel, breeder and burnable poison elements. As is well known, uranium based fuel includes a mixture of the fissile isotope (U235) and breeder isotope (U238) of uranium. Further, during the life of a reactor, breeder elements/isotopes (e.g., U238 and Th232) transmute to fissile (i.e., fuel) elements (e.g., Pu239 and U233), and thus breeder particles become fuel particles during operation. Also, some reactor designs may include burnable poisons (e.g., B, Th) mixed in with fuel elements. Therefore, for ease of reference the term "fuel particle" is used herein to refer generally to particles that include fuel (i.e., fissionable) elements, breeder elements (i.e., elements that transmute into fissionable elements upon absorbing a neutron), burnable poison elements, and any mixture thereof.

The use of precision placement of fuel particles and 3D printing/additive manufacturing methods to form fuel elements enables more precise controls of the composition the graphite throughout the fuel element and controllable separation of fuel/poison/breeder particles within the fuel zone (i.e., the "packing fraction" of fuel within the fuel zone) of the fuel pebble. Consequently, the embodiment methods enable higher quality fuel elements to be manufactured than feasible with conventional methods, while lowering the costs of manufacturing, increasing yields, and improving the quality control process. The use of 3D printing/additive manufacturing methods enable efficient and high-yield manufacture of fuel elements having complex geometries, such as spherical fuel pebbles. Further, the embodiment methods are suitable for scaling up into production lines capable of manufacturing large volumes of fuel elements cost effectively and with tight quality control.

The word "exemplary" is used herein to mean "serving as an example, instance, or illustration." Any implementation described herein as "exemplary" is not necessarily to be construed as preferred or advantageous over other implementations.

The various embodiment methods are particularly suitable for manufacturing spherical fuel pebbles for use within pebble bed HTRGs. An example of a pebble bed HTGR reactor is illustrated in FIG. 1. This illustration shows the placement of fuel pebbles within the fuel zone. The illustrated example of a fuel pebble is a sphere with a diameter of about 6 cm (about the size of a baseball) although fuel pebbles may be larger or smaller, such as about 3 cm to about 12 cm in diameter. Fuel pebbles are loaded within the core barrel in order to create the reactor core. In this embodiment design, a steel pressure vessel includes within it a core barrel that supports graphite reflector blocks, which define an interior space in which the fuel pebbles are positioned to form the cylindrical reactor core. Control rods enter the pressure vessel and pass into the graphite reflector blocks. The coolant gas flows into the pressure vessel through a gas inlet through the graphite reflector blocks and the core formed by the fuel pebbles and out through a gas outlet (not shown in FIG. 1). In the example pebble bed reactor illustrated in FIG. 1, there may be approximately 170,000 fuel pebbles in the core, each of which may include approximately 9 grams of fuel or any heavy metal loading desired.

Fuel pebbles are primarily made of graphite, which provides the neutron moderator for the reactor as well as the structural support for individual fuel particles. Heat from fission is conducted through the fuel pebble to its surface where heat is removed by the cooling gas (e.g., helium or a helium/argon mixture), which flows around the fuel pebbles and out of the core to the energy conversion system (not shown).

Figure 2:
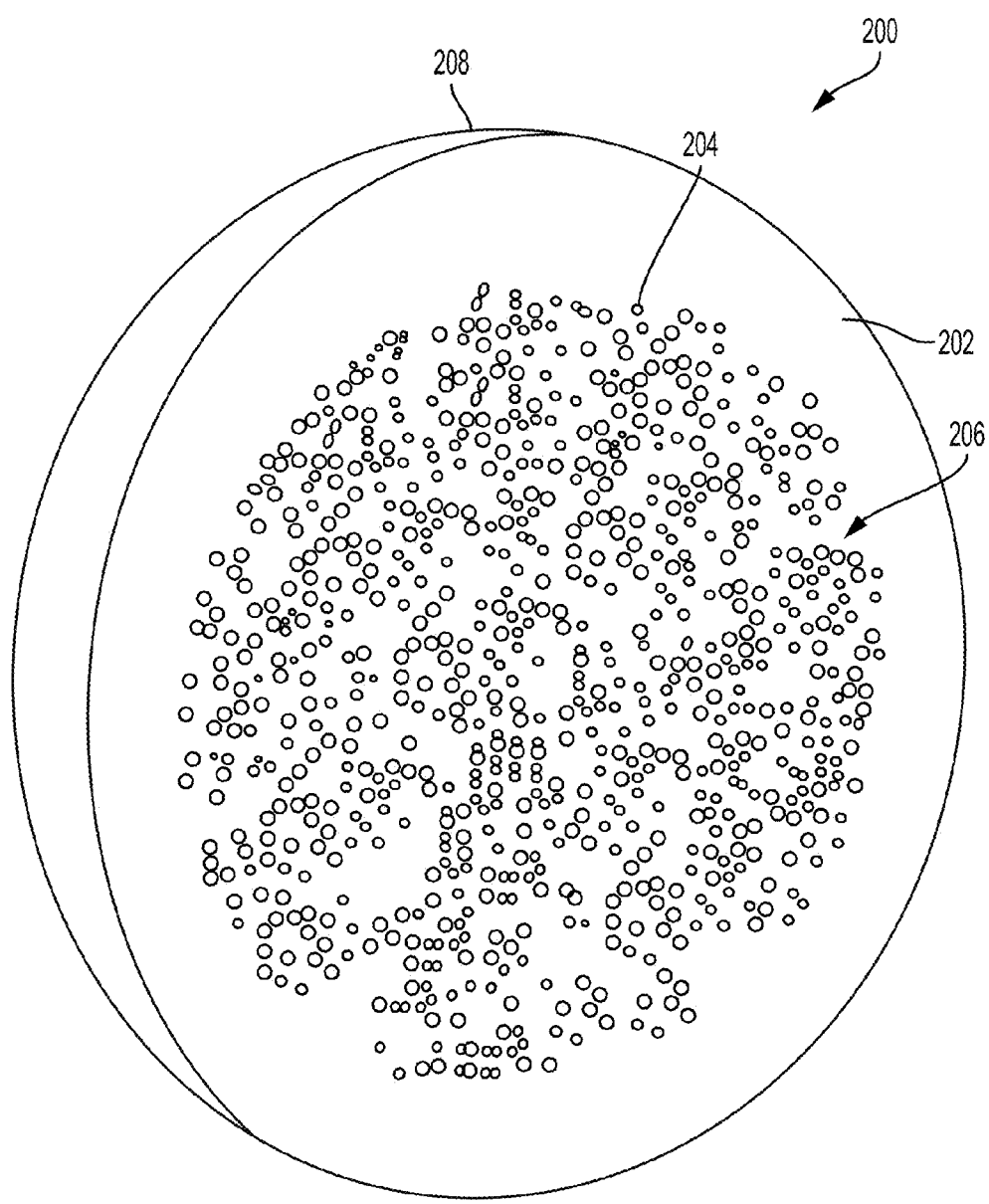
FIG. 2 is a cross-sectional image of a fuel pebble according to various embodiments.

FIG. 2 illustrates a conventional pebble bed reactor fuel pebble 200 in cross-section. A fuel pebble 200 is made up of a graphite matrix 202 that encapsulates a large number of small fuel particles 204, which are visible as the small dots towards the center 206 of the fuel pebble 200 illustrated in FIG. 2. An exterior surface of the fuel pebble may be formed with a ceramic fuel free shell 208 or coating that provides structural rigidity and protects graphite from erosion and exposure to oxygen. The outer 0.5 cm of the fuel pebble 200 may be a fuel free zone that does not contain fuel particles 204 and is made up of only the graphite matrix 202 material.

Conventional fuel pebbles 200 are manufactured by blending fuel particles 204 in graphite that forms the matrix 202. As illustrated in FIG. 2, such an uncontrolled process may result in an uneven distribution of fuel particles 204 within the matrix 202. Accommodating the inevitable clumping of fuel particles requires reducing limits on the power-density and/or the burn up that fuel pebbles are permitted to experience. This process is also a manual batch process, which restricts the production rate of the fuel pebbles 200 and could introduce inconsistent quality of the fuel pebble 200.

Figure 3:
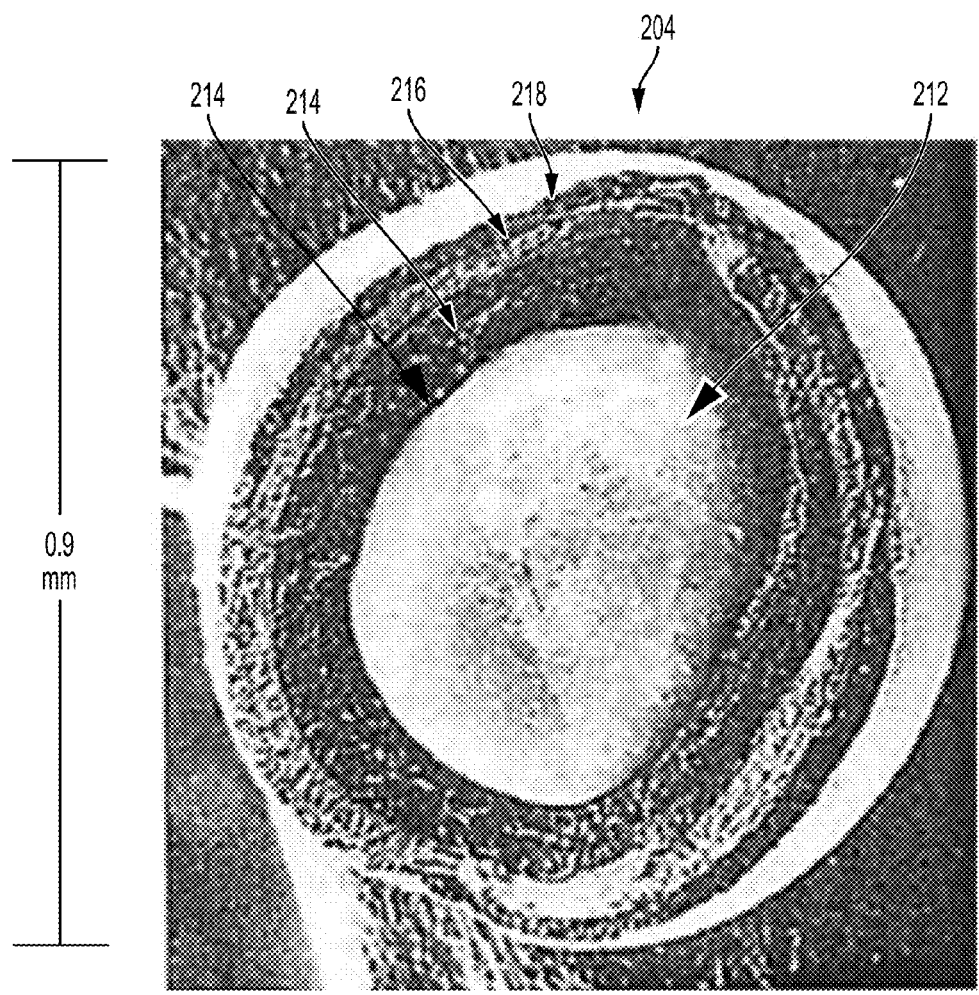
FIG. 3 is a cross-sectional image of a TRISO coated nuclear fuel particle.

As illustrated in FIG. 3, a fuel particle 204 has a coated multilayer structure with a fuel kernel 212 surrounded by multiple layers of ceramic and graphite materials. In particular, the fuel kernel 212 may include a fissile oxide (e.g., $UO_2$ or $ThO_2/UO_2$) or carbide, which is surrounded by a buffer layer 213. The buffer layer 213 may include a porous carbon material such as graphite. The buffer layer 213 accommodates expansion of the fuel kernel 212 and serves as a reservoir for fission gases. The buffer layer 213 is surrounded by a dense inner carbon layer 214, e.g., a layer of pyrolytic carbon. The inner carbon layer 214 seals the buffer layer 213 and attenuates migration of radionuclides. The inner carbon layer 214 is surrounded by a ceramic layer 216, e.g., a layer of silicon carbide or zircon carbide. The ceramic layer 216 constrains fission products (i.e., retaining fission products within the kernel), thereby preventing fission products from migrating out of the kernel, and improves structural rigidity. The ceramic layer 216 is covered by an outer carbon layer 218 that may also contain pyrolytic carbon. The outer carbon layer 218 acts as a further barrier to fission gas release. Such fuel particles 204 may be referred to as Tri-structural-ISOtropic (TRISO) fuel particles. The multilayer structure of fuel particles has been well tested and characterized in earlier HTGR designs, and exhibit very good performance for retaining fission products under extreme temperature conditions.

Further details of an example fuel pebble and its included fuel particles are listed in the table shown in FIG. 4. This table lists example diameters of the fuels user, thicknesses of the outer graphite fuel free shell, diameters and densities of the fuel kernels, example materials making up the coatings of the fuel particles, and example fuel loadings.

Conventionally, graphite fuel pebble forming techniques involve labor intensive processes that require a number of interim quality checks in order to ensure that human error does not result in poor quality pebbles. Referring again to FIG. 2, one of the key challenges in manufacturing a fuel pebble is insuring the fuel particles 204 are homogenously distributed throughout the interior portion 206 graphite matrix of the fuel pebble 200. Conventionally, homogenization performed by randomized mixing of the graphite matrix before the fuel pebble is formed.

However, this process relies on achieving a statistical homogeneous mixture of the coated particles and the graphite matrix material. A further limitation of this process is the fact that it is not well suited for mass production of fuel pebbles. In addition, such techniques are not capable of precisely locating fuel particles within a pebble.

Conventional pebble forming techniques involve a core pressing step and a fuel free zone pressing step. Due to these pressing steps, the fuel particles used in such techniques require an additional overcoat layer to withstand the high pressures applied during the pressing steps and to insure sufficient fuel particle spacing in a randomized fuel particle/graphite matrix.

To address these limitations of conventional methods, the various embodiments include a method of forming a fuel pebble that enables the precise placement of fuel particles while simplifying the fabrication of the matrix that holds the fuel particles and/or burnable poison particles within the core and the graphite fuel free shell that surrounds the core. In particular, the various embodiments provide a method of using 3D printing/additive manufacturing methods to form fuel pebbles from a fine graphite powder and/or graphite particles or spheres about the same size as fuel particles. Fuel elements of various shapes and sizes, such as approximately spherical fuel pebbles, are formed by using 3D printing/additive manufacturing techniques to bind thin layers of graphite into discs of varying diameters. The formed spherical fuel pebbles are then compressed using an isostatic press according to conventional manufacturing methods to form the finished fuel pebble.

Various embodiment methods enable the controlled positioning of fuel particles and/or burnable poison particles within a fuel zone formed in a layer-by-layer format that can control the separation distance between fuel particles within layers and between layers. This method also reduces the waste as the supporting powder is removed and reused, in contrast to conventional fuel pebble manufacturing processes that require the pebble to be cut to size by a lathe after pressing resulting in wasted graphite shavings.

Additionally, by controlling the placement of fuel, poison and breeder particles within fuel elements (e.g., fuel pebbles), the various embodiment manufacturing methods do not need to account for the stresses applied to fuel particles when two or more particles are touching during the application of high pressures involved in the pebble forming processes. Eliminating the potential for high local stresses due to particles pressing against one another eliminates the need for the additional overcoat on fuel particles conventionally applied to give fuel particles sufficient strength to resist such stresses. Therefore, in contrast to conventional pebble forming techniques, the various embodiments may utilize fuel particles that do not include an overcoat, such as the non-overcoated TRISO fuel particles described herein. This reduces a step in the manufacturing of TRISO fuel particles, thereby decreasing costs and increasing process yields.

Figure 5B:
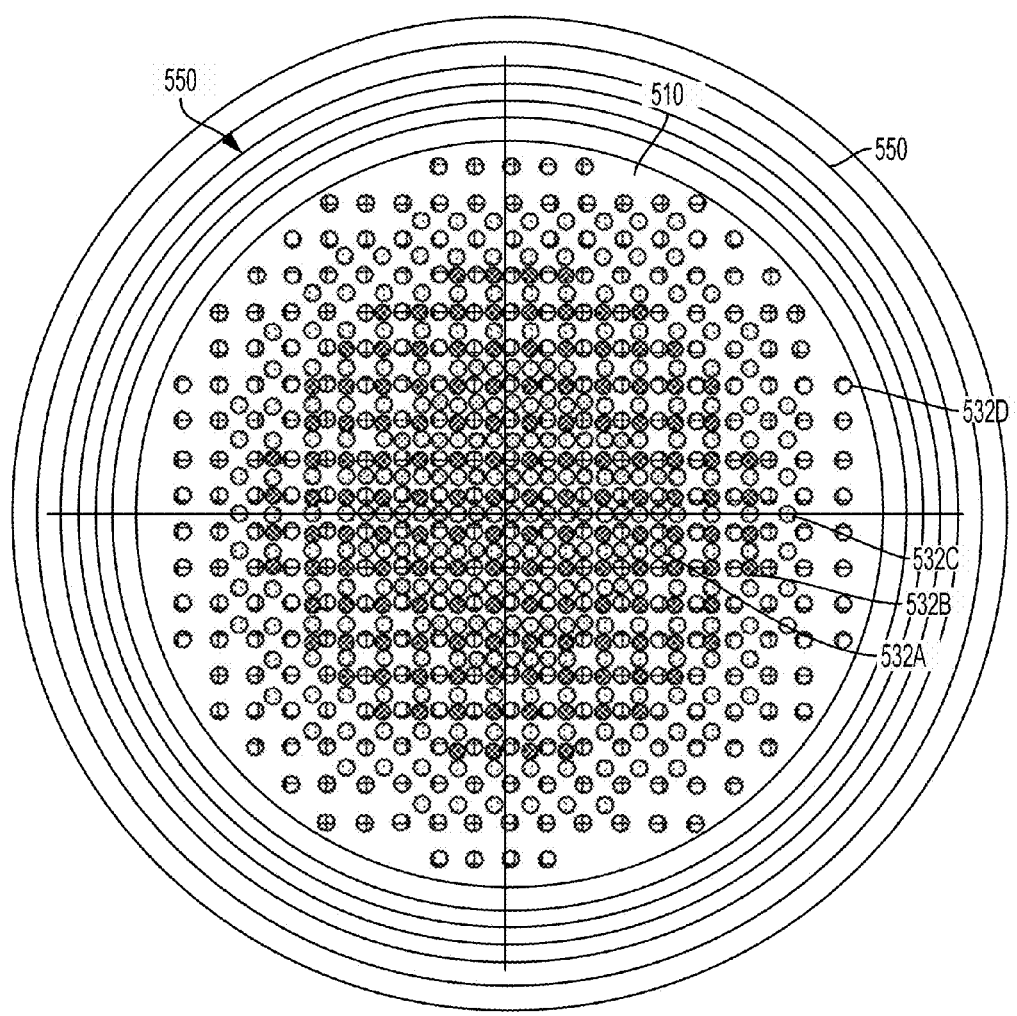
FIG. 5B illustrates a top sectional view along a fuel particle layer of the fuel pebble of FIG. 5A, and showing underlying fuel particle layers.

FIG. 5A illustrates side sectional view of a fuel pebble 500 according to various embodiments of the present disclosure. FIG. 5B illustrates a top sectional view of a fuel pebble 500, taken along a fuel particle layer 532D of FIG. 5A and showing underlying fuel particle layers 532C-A. Again, the various embodiments may be used to manufacture fuel elements of a variety of shapes and sizes and are not limited to the manufacture of spherical fuel elements.

Referring to FIGS. 5A and 5B, a fuel pebble 500 includes a fuel zone 510 and a fuel free shell 520 disposed around the fuel zone 510. The fuel zone 510 and the fuel free shell 520 are both formed by depositing graphite layers 550 with a binder applied to hold the graphite together into a shape until final processing (e.g., sintering). For example, the same graphite layer may form a layer of the fuel zone 510 and a layer of the fuel free shell 520. As such, in contrast to conventional fuel pebbles, the same processes are used to form the fuel zone 510 and the fuel free shell 520, enabling fuel pebbles to be formed (prior to compression and sintering) in a single continuous process. By using 3D printing/additive manufacturing methods to apply the binder to each layer, the shape of fuel pebble 500 may be controlled. In some embodiments as illustrated in the figures, the fuel pebble 500 may be spherical. Again, fuel elements manufactured according to various embodiments are not limited to any particular shape or size. For example, fuel elements manufactured according to the various embodiments may be ovoid, pill-shaped, prismatic, columnar, conical, or the like. Some fuel elements may be manufactured using embodiment methods with interior passages for flowing coolant through the fuel element by not depositing graphite at the locations of the interior passages. In some embodiments, the shape of the fuel pebble 500 may be selected in accordance with corresponding characteristics thereof, such as fission rate and/or heat convection characteristics.

In addition to fissionable and transmutable heavy metal fuel, the fuel zone 510 may be loaded with burnable poisons to control reactivity as is well known. Burnable poisons may be included in fuel pebbles in a variety of manners, one of which is in the form of particles included in the fuel zone with fuel particles, and another of which is in the form of mixtures within fuel particles. In such embodiments, burnable poison particles may be placed within layers of the fuel zone 510 in the same manner as fuel particles. For example, one or more layers of the fuel zone 510 may include both fuel particles (e.g., fissile particles) and burnable poison particles. A pattern in which the fuel and burnable poison particles are arranged in a particular layer may be substantially regular, or may vary according to location within the fuel zone 510. In other embodiments, the fuel zone 510 may also include breeder particles, such as thorium fertile particles. Therefore, for ease of description, all particles placed in layers of the fuel zone 510 are referred to herein as "fuel particles," regardless of whether the particles include or are substantially only burnable poisons or breeder particles. Thus, references to fuel particles in the embodiment descriptions and the claims are not intended to exclude the inclusion of burnable poisons within particles. In other words, references to fuel particles in the descriptions and the claims are intended to encompass particles containing only fuel, particles containing some fuel and some burnable poisons, and particles containing only burnable poisons.

The fuel zone 510 includes fuel particles 530 disposed between and/or embedded in the graphite layers 550. The fuel particles 530 may be similar to the fuel particles 204 described above. In some embodiments, the fuel pebble 500 will have a diameter of from about 5 cm to about 7 cm, for example, about 6 cm once completed i.e. pressed and sintered. The fuel free shell may have a thickness of about 0.3 cm to about 1.5 cm, for example, about 1 cm. However, the various embodiments are not limited to any particular fuel pebble dimensions. The process allows for the manufacturing of any diameter of the fuel zone 510 and final fuel pebble 500.

The fuel particles 530 are arranged in fuel particle layers 532, which are separated by, and/or imbedded in, the graphite layers 550. For purposes of illustration, only four fuel particle layers 532 (layers 532A-532D) are shown in FIGS. 5A and 5B. However, the fuel pebble 500 may comprise any number of fuel particle layers 532 sufficient to distribute the fuel particles 530 throughout the fuel zone 510. For example, fuel zone 510 may include from 10 to 32 fuel particle layers 532, from 12 to 30 fuel particle layers 532, from 14-28 fuel particle layers 532, i.e., about 16 fuel particle layers 532. It is also possible to vary the particle patterns according to a given fuel power density and thus, various particle patterns are within the scope of the present disclosure.

While the fuel pebble 500 is described as being fabricated in distinct graphite layers 550, once the fuel pebble is finished with all manufacturing steps these individual graphite layers 550 may not be distinguishable from one another in the fuel pebble 500. Specifically, the processes of compressing and sintering will cause the layers to fuse. In other words, the graphite layers 550 may be configured and processed so that they effectively form a single graphite body in which fuel particle layers 532 are disposed, particularly after the fuel pebbles 500 are compressed and sintered.

For convenience of explanation, the manufacture of a fuel pebble 500 is divided into a base portion 560, a central portion 570 that includes the fuel zone, and a cap portion 580, although the processes forming the three portions may be performed in a single continuous process. The base portion 560 and the cap portion 580 encompass the applied layers that do not include fuel particles, while the central portion 570 encompasses layers made up of both a ring of graphite that will form the fuel free shell and a central circular layer including fuel particles that forms the fuel zone. The base portion 560 may include a portion of the fuel pebble 500 disposed below a first fuel particle layer 532A. In other words, the base portion 560 may include portions of the fuel free shell 520 and fuel zone 510 disposed below a lowermost fuel particle layer 532A. The base portion 560 may also include a portion of the fuel zone 510 in which the first fuel particle layer 532A is at least partially imbedded. The cap portion 580 includes a corresponding portion of the fuel particle 500 above an uppermost fuel particle layer 532 (not shown). The central portion 570 includes a remaining portion of the fuel pebble 500. The base portion 560 and the cap portion 580 may have a cord dimension equal to the fuel free shell thickness in the central portion 570.

The fuel particles 530 in each fuel particle layer 532 are disposed in a pattern, such as by using a placement chuck that positions individual fuel particles in a graphite layer such that adjacent fuel particles 530 are regularly spaced apart from one another by a first distance. In addition, the layers 532 may also be regularly spaced apart from one another by the layer thickness with particles in each layer offset from one another to provide a second separation distance. The first and second distances may be the same or different. The first and second distances may depend upon the total heavy metal loading of the fuel pebble 500. Fuel particles 530 may be placed in layers in a regular pattern such as hexagonal or square to form three-dimensional packing patterns, with the separation distances and packing patterns selected to achieve design objectives. In some embodiments, the fuel particles 530 may be disposed, such that a minimum distance between adjacent fuel particles 530 in the same layer 532, and between adjacent fuel particles 530 in different adjacent layers 532, is the same.

Said another way, the fuel particle layers 532 may be spaced apart and patterned such that the fuel particles 530 are separated from adjacent fuel particles 530 in three dimensions by a minimum distance that depends upon the total heavy metal loading of the fuel pebble 500. For example, when viewed from perspective in FIG. 5B, the fuel particles 530 of layer 532C may be disposed between the fuel particles 530 of layer 532D. In other words, the fuel particles of adjacent layers, such as layers 532D and 532C, may be disposed so as not to directly overlap one another in a vertical direction. The distribution and spacing of fuel particles within fuel elements are not limited to the examples illustrated in the figures. In various embodiments, the fuel particles may be positioned according a variety of different layer patterns, particularly patterns that enable the fuel particles 530 to be regularly spaced apart from adjacent fuel particles 530. For example, fuel particles may be positioned in fuel elements using the embodiment methods in one of two regular lattices that achieve highest average density; face-centered cubic (fcc) (also called cubic close-packed), or hexagonal close-packed (hcp). Both lattices are based upon sheets of spheres arranged at the vertices of a triangular tiling, differing in how the sheets are stacked upon one another. The fcc lattice is also known to mathematicians as that generated by the $A_3$ root system.

However, in some embodiments, the fuel particles 530 may be disposed within fuel pebbles 500 in other patterns. In particular, the fuel particles may be deposited at different densities in different regions of the fuel zone 510 of the fuel pebble. For example, the manufacturing methods of the various embodiments may be used to place fuel particles in specific locations within fuel pebbles so that as distance from the center of the fuel zone 510 increase, the density of the fuel particles 530 may also increase. Manufacturing fuel pebbles in this manner may provide power density benefits, such as by helping to control the peak temperature at the center of fuel pebbles while enabling a higher fuel particle loading in fuel pebbles. Such as a change in density of fuel particles with radial position may be consistent (e.g., may change linearly or exponentially with distance from the center of the fuel zone 510). For example, the fuel particle density of the fuel zone 510 may increase from the center to the outer surface thereof. In other embodiments, the particle density of the fuel zone 510 may be stepped as a function of distance from the center of the fuel pebble. For example, the manufacturing methods of the various embodiments may be used to form a central region having a relatively low fuel particle density within the fuel zone 510, and a peripheral region that surrounds the central region that has a relatively high fuel particle density. In other embodiments, the manufacturing methods of the various embodiments may be used to form the fuel zone 510 with multiple concentric peripheral regions with different fuel particle densities.

Variations in the fuel particle density within fuel pebbles may be accomplished by omitting a number of fuel particles 530 from a particular region of the fuel zone 510, such as the central region of the fuel zone 510, but otherwise maintaining the spacing of the fuel particles 530 in the fuel particle layers. In the alternative, fuel particle density may be adjusted by varying the spacing between adjacent fuel particles 530 in different regions of the fuel zone 510. For example, the distance between fuel particles 530 in the central region may be greater than that of one or more peripheral regions of the fuel zone 510. The ability of the manufacturing methods of the various embodiments to place fuel particles in specific locations within fuel pebbles enables a wide variety of fuel particle loading configurations to be used.

Fuel pebbles manufactured according to various embodiments may include composite particle layers including different types of particles, including fissile particles, breeder particles, and poison particles. For example, each fuel particle layer of the fuel pebble may include fissile and poison particles disposed in a pattern. The distribution of fuel particles (e.g., fissile particles) and poison particles may also vary in the fuel zone 510. For example, the central region of the fuel zone 510 may include a higher density of burnable poison particles (e.g., a higher ratio of burnable poison particles to fuel particles) than one or more peripheral regions of the fuel zone 510. In other words, the one or more of the peripheral regions may have a higher density of fissile particles than the central region. Having a higher density of fuel particles in the peripheral region, and/or having a higher ratio of poison to fuel particles in the central region, may provide improved heat transfer characteristics enabling higher fuel loading in each pebble, and/or may improve fuel utilization of a fuel pebble.

Figure 5C:
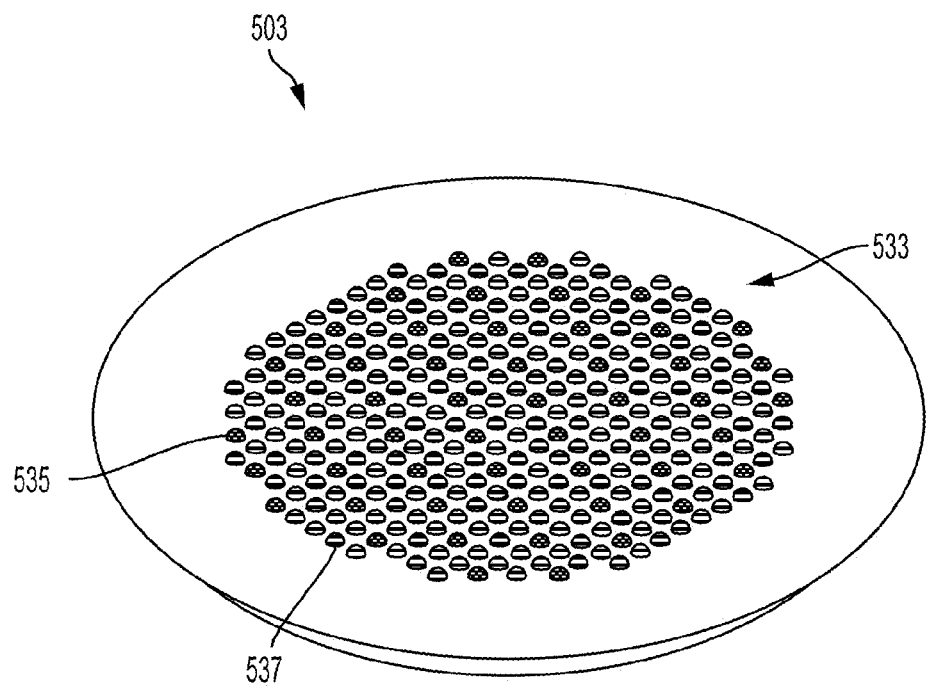
FIG. 5C is a perspective sectional view of a fuel pebble according to various embodiments of the present disclosure.

FIG. 5C illustrates a perspective sectional view of a fuel pebble 503 including a composite particle layer 533 manufactured according to various embodiments. Referring to FIG. 5C, the composite particle layer 533 may include first particles 535 and second particles 537 disposed in a pattern. The first and second particles 535, 537 may be selected from fissile particles, burnable poison particles, and breeder particles, for example.

The relative density of first and second particles 535, 537 within the fuel pebble 503 may be selected according to particle type. For example, a composite particle layer may include a relatively large number of fissile particles and a relatively small number of burnable poison particles. In the alternative, a composite particle layer may include a relatively large number of breeder particles and a relatively small number of fissile particles. In some embodiments, the first particles 535 may be fissile particles and the second particles 537 may be burnable poison particles or breeder particles.

Figure 5D:
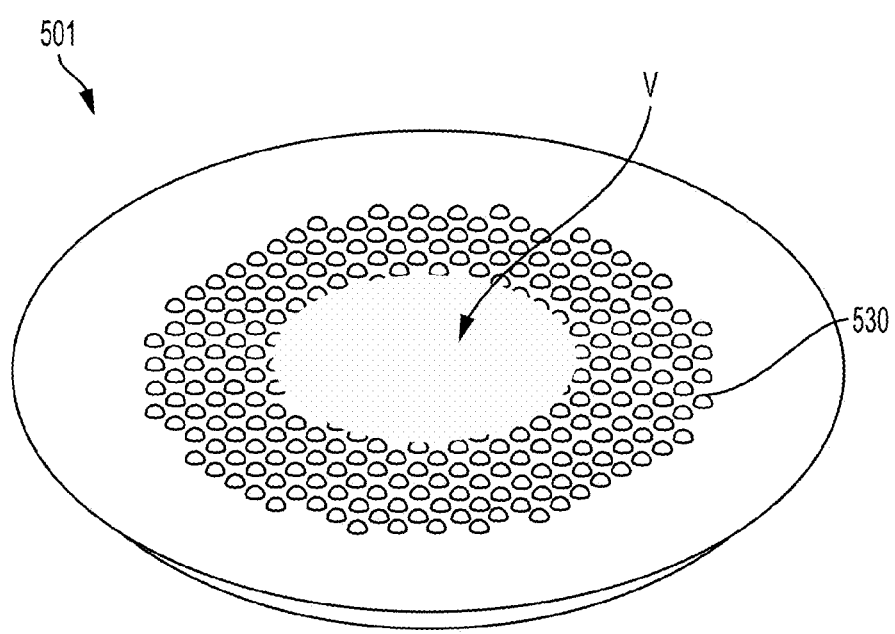
FIG. 5D is a perspective sectional view of a fuel pebble according to various embodiments of the present disclosure.

As an example, FIG. 5D illustrates how the manufacturing methods of the various embodiments may be used to form fuel pebbles 501 with a central volume V that has little or no fuel/poison particles 530. Such a configuration may result in fuel pebbles that exhibit flatter temperature profiles during reactor operations. The manufacturing methods of the various embodiments may also be used to control the density of graphite within the central void V, such as to provide a region of lower strength at the center to enable inward expansion to relieve pressures within fuel pebbles due to fission gasses.

Figure 6A:
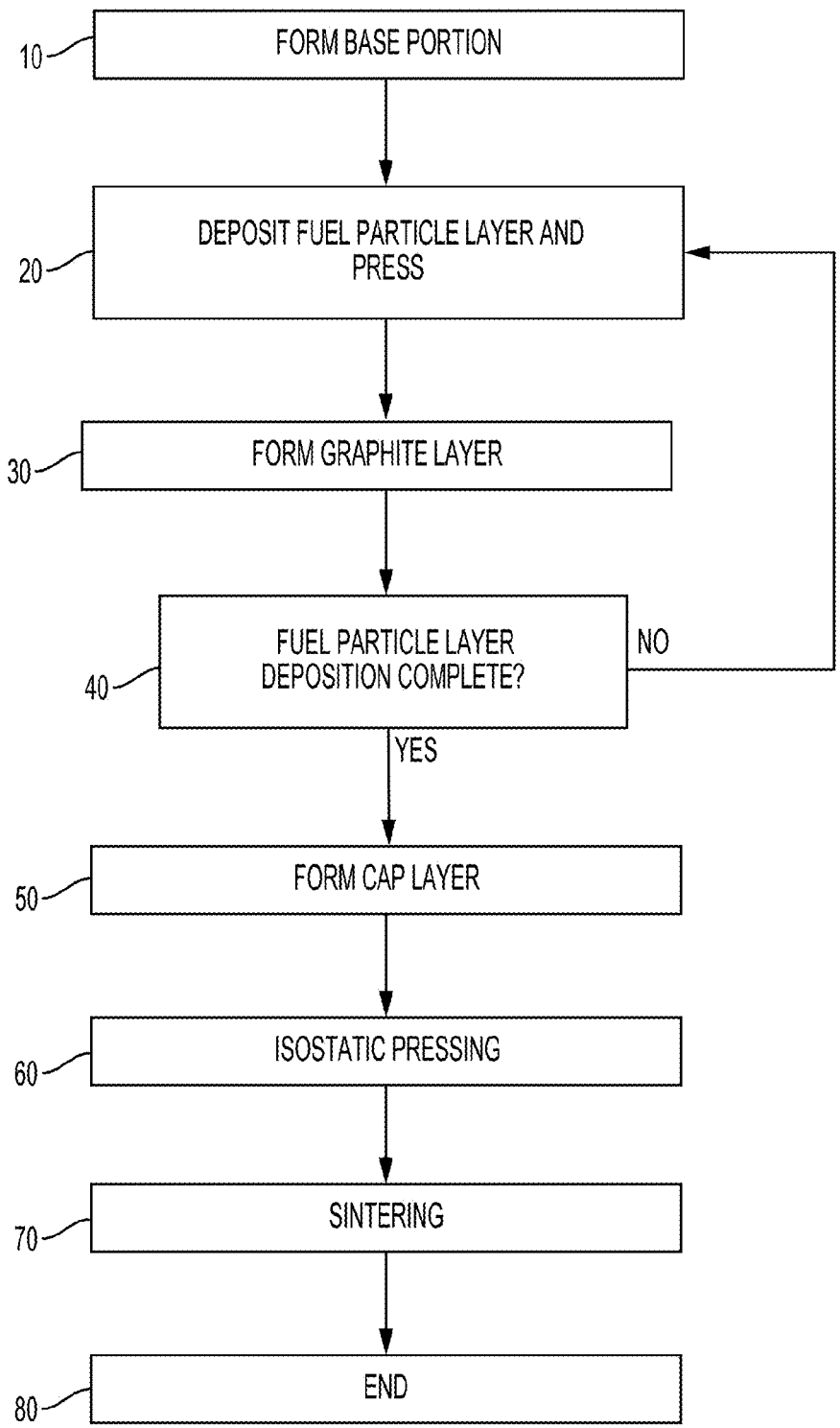
FIG. 6A is a block flow diagram illustrating a method of forming a fuel pebble, according to various embodiments of the present disclosure.
Figure 6B:
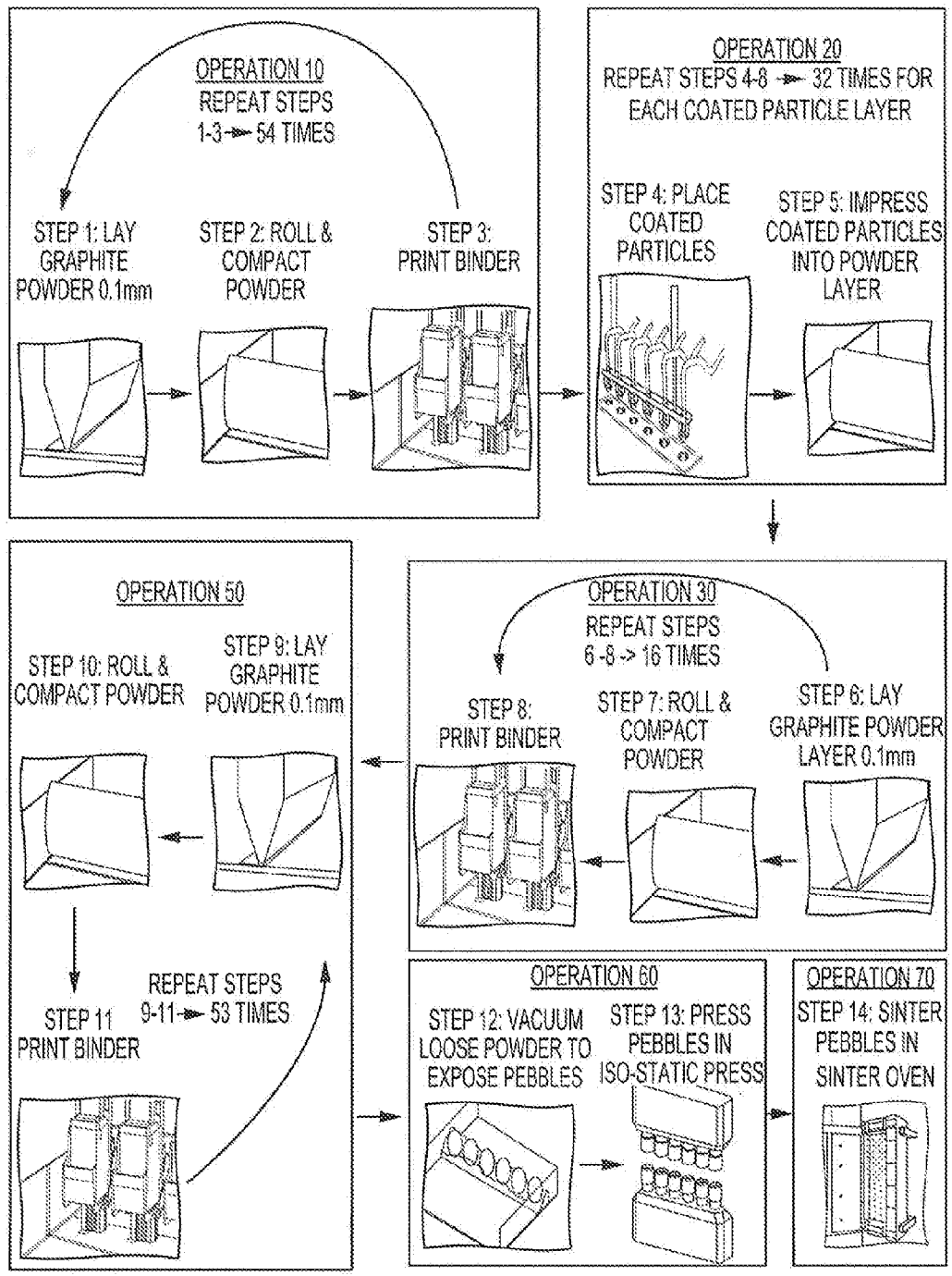
FIG. 6B graphically illustrates operations of the method of FIG. 6A.
Figure 7A:
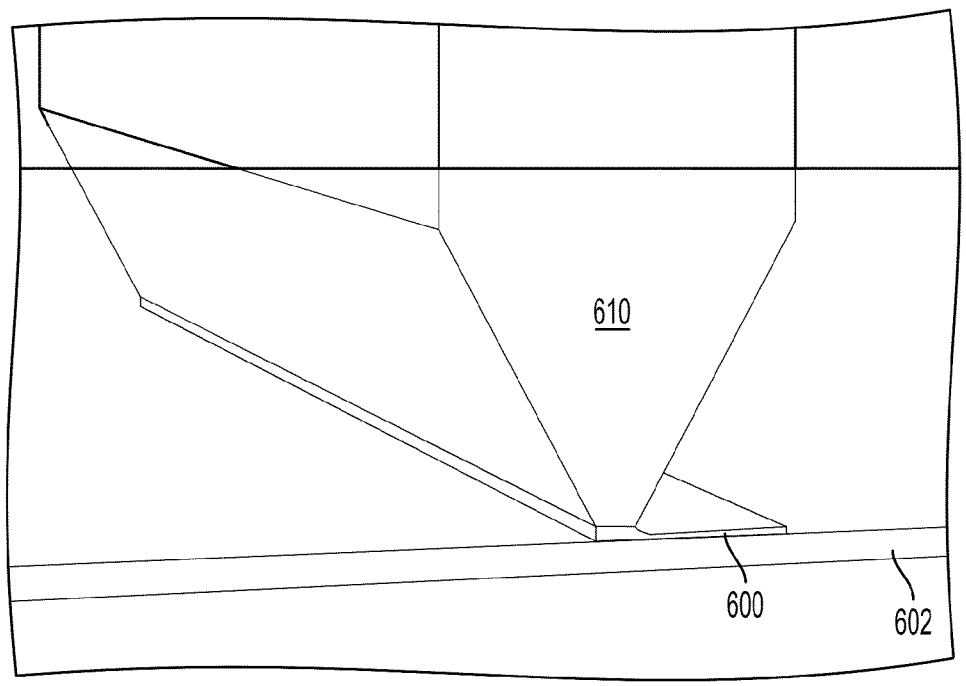
FIGS. 7A, 7B, 7C, 8A, 8B, 8C, 9A, 9B, 9C, 10A, 10B, and 11 include enlarged views of operations included in FIG. 6B.
Figure 7B:
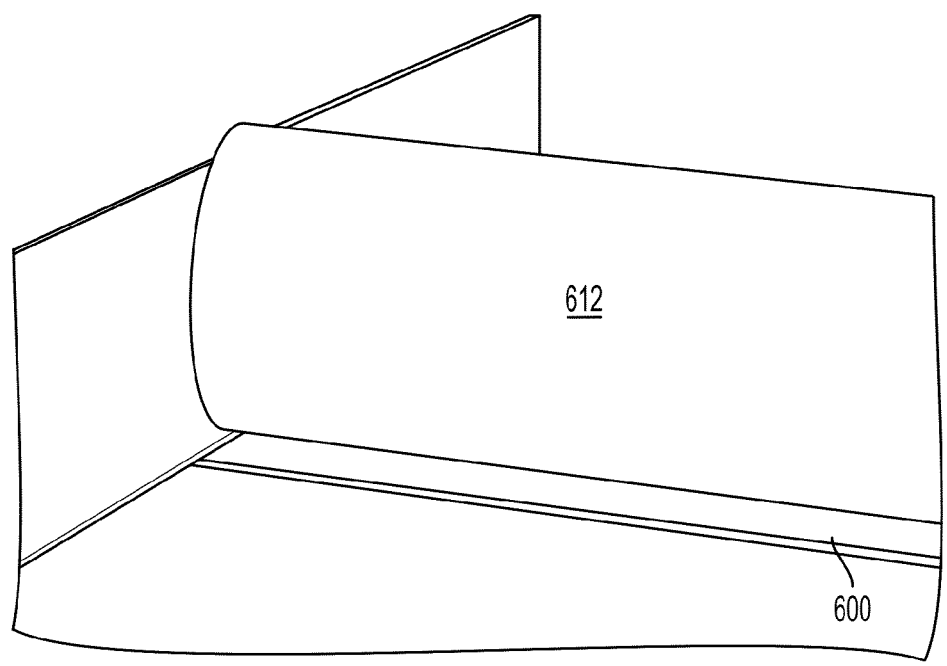
Figure 7C:
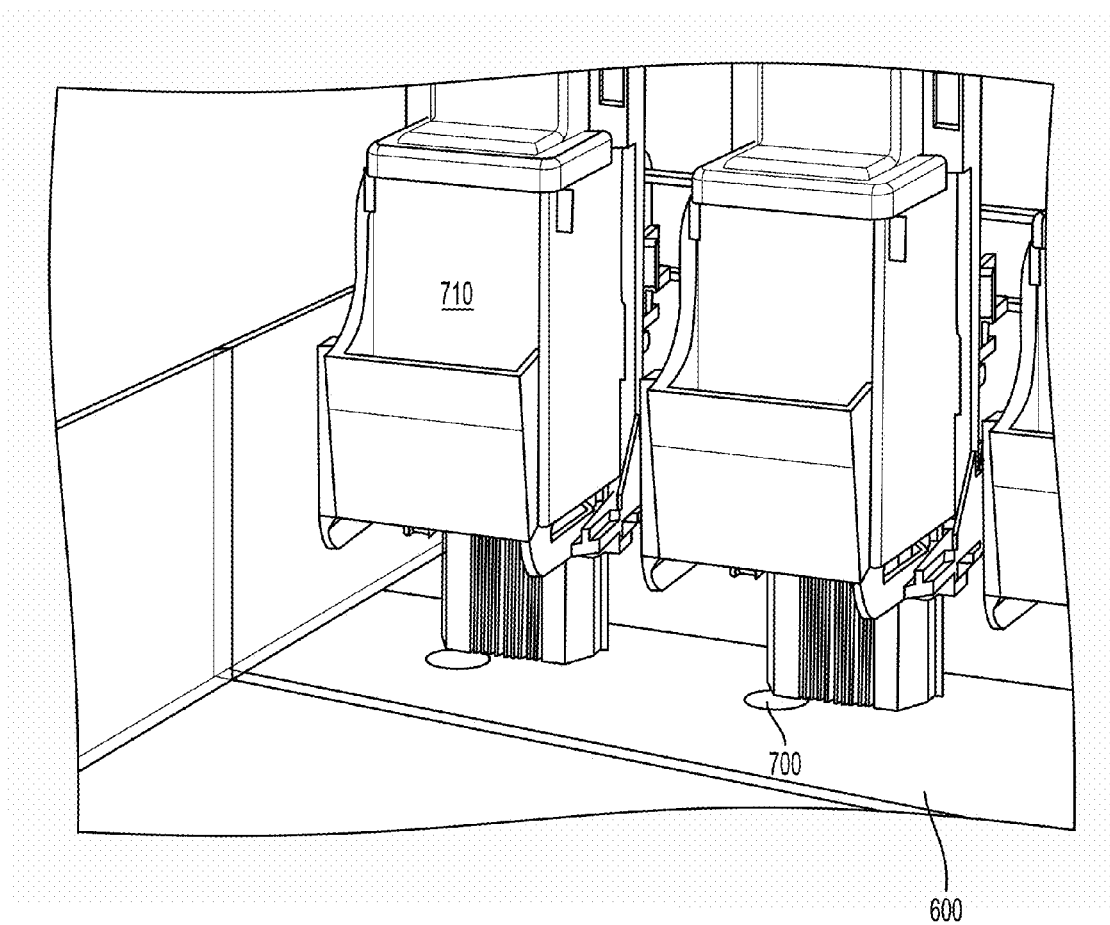

FIG. 6A is a process flow diagram illustrating a method 5 of forming a fuel pebble, according to various embodiments. FIG. 6B graphically illustrates operations of the method 5. FIGS. 7A, 7B, 7C, 8A, 8B, 9A, 9B, 9C, 10A, 10B, and 11 include enlarged views of the operations illustrated in FIG. 6B.

Referring to FIGS. 6A, 6B, and 7A-7C, in operation 10, the method 5 includes forming a graphite base portion 560 of a fuel pebble 500, as shown in FIG. 5A. In particular, operation 10 includes depositing graphite powder on a substrate 602 to form a graphite layer 600 (step 1). The graphite powder may be deposited using any suitable method, such as, for example, by a slot coating apparatus 610 or the like. The graphite layer 600 is then pressed (step 2). The graphite layer 600 may be pressed using a roller 612. However, any suitable pressing device, such as a vertical press, or the like, may be used. The pressing ensures that the graphite layer 600 is evenly packed.

A binder 700 may be applied to the graphite layer 600 (step 3) such as by using 3D printing/additive manufacturing methods. The binder 700 may be liquid binder that can be printed on the graphite layer 600 using, for example, an inkjet printer 710 or the like. In particular, the binder 700 may be an alcohol-based binder or a water-based binder. The binder 700 is applied in a particular pattern on the graphite layer 600. For example, the binder 700 may be applied in a circular pattern corresponding to a cross-sectional portion of the fuel pebble 500.

Operation 10 (i.e., steps 1-3) may be repeated a number of times to increase the thickness of the graphite layer 600 with each layer having a larger diameter (in the case of a spherical fuel element), such that the graphite layer 600 forms a base portion 560 in form of a portion of a sphere having a cord dimension approximately equal to a thickness of the pebble fuel free shell. For example, each time operation 10 is repeated, the thickness of the graphite layer 600 may be increased by about 0.05 mm to about 0.2 mm, for example, about 0.1 mm. However, the thickness of the graphite layer 600 may be dependent upon the minimum diameter of graphite particles of the graphite layer 600.

This layer forming operation 10 may be repeated about 50 to about 100 times to form the base portion 560, which in spherical fuel elements is a portion of a sphere. For example, operation 10 may be repeated, such that the base portion 560 has a thickness of from about 0.3 cm to about 1.5 cm (i.e., about 1 cm), such that the thickness of the base portion 560 corresponds to the thickness of the fuel free shell 520. As described above, the base portion 560 may also include a portion of the fuel zone 510 disposed below the first fuel particle layer 532A. As such, the thickness of the base portion 560 may be increased by an additional amount (or the base portion may include a first layer of graphite to form the central portion 570), such as from about 1 mm to about 2 mm (i.e., about 1.5 mm), such that the base portion 560 includes a portion of the fuel zone 510, in which fuel particles 530 may be imbedded, as discussed below. In other words, the base portion 560 may have a thickness of from about 3 mm to about 12 mm, i.e., about 11.5 mm for typical fuel pebble types of fuel elements; more or less for other shapes and sizes of fuel elements.

The amount of graphite powder 600 deposited may be varied according to processing conditions and fuel pebble design characteristics. As such, the number of times that the operation 10 is repeated may be increased or decreased accordingly.

In some embodiments, instead of using graphite powder to form each graphite layers, the graphite may be in the form of graphite sphere, which may be about the same size as fuel particles. Spherical graphite may be particularly beneficial in forming the fuel zone of a fuel element when the graphite spheres are close in size (e.g., approximately the same size) as fuel particles. An example of a suitable form of graphite spheres is disclosed in U.S. Pat. No. 8,173,208, which is incorporated by reference for purposes of disclosing compositions and methods of making dustless graphite spheres. Such graphite spheres may be formed of graphite powder and a resin. An advantage of using graphite spheres is that spheres about the same size as fuel particles may better support fuel particles in a layer than a layer of fine graphite powder due to their similar size and density. In some embodiments, the graphite layer 600 formed in the various layer-forming steps may be a combination of graphite powder and graphite spheres. In some embodiments, graphite layers 600 that do not include fuel particles (i.e., layers forming the base portion 560 and top portion of a the fuel pebble) may be formed using fine graphite powder, while the graphite layers that include fuel particles (i.e., the fuel zone of the fuel element) may be formed using graphite spheres or a mixture of graphite spheres and graphite powder. Further, the graphite layers including fuel particles (the fuel zone) may be manufactured by depositing graphite spheres in the central fuel zone portion where fuel and depositing graphite powder in a surrounding portion 550 (FIG. 5B) or 535 (FIG. 5D).

Figure 8A:
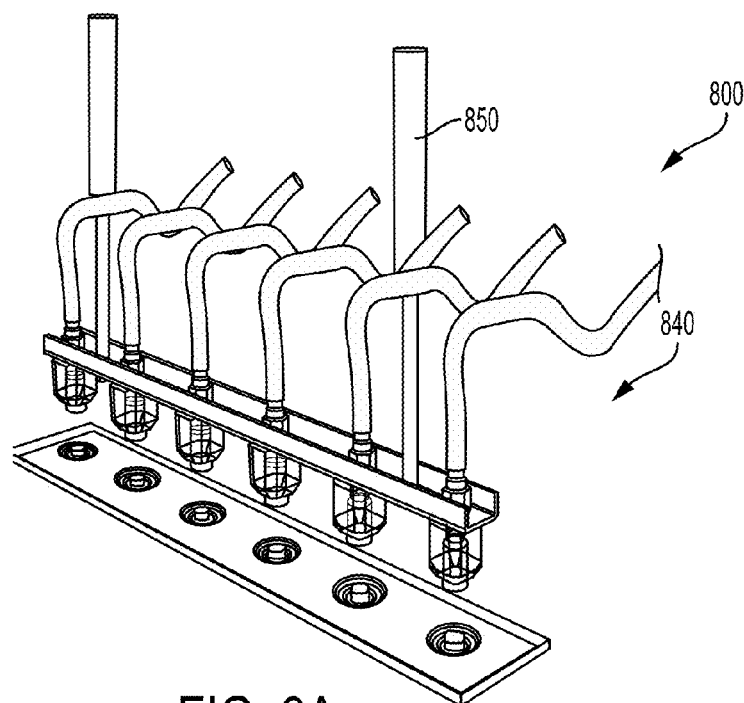
Figure 8B:
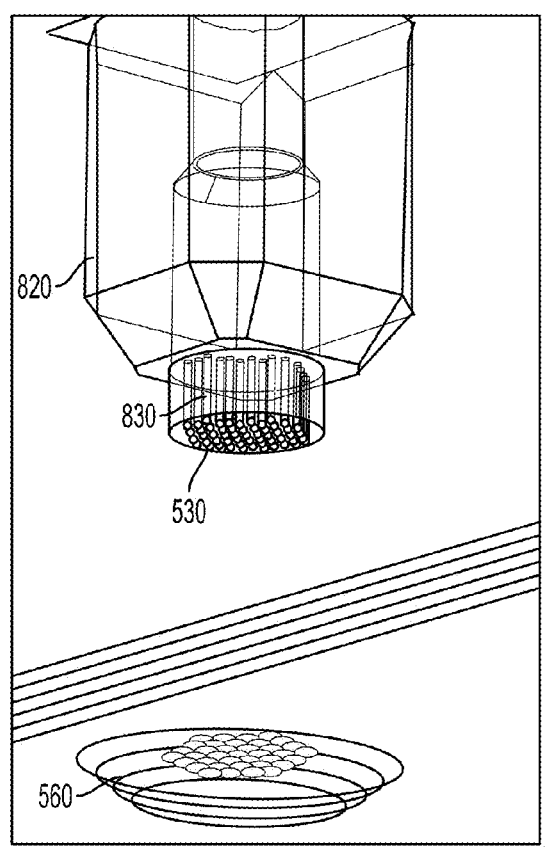
Figure 8C:
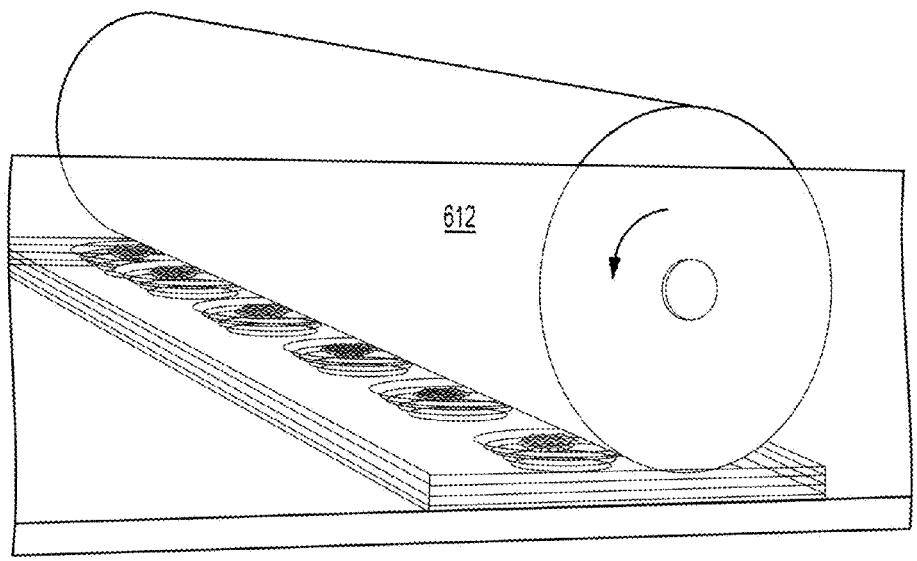

In operation 20 illustrated in FIGS. 6B, 8A and 8B, a deposition apparatus 800, such as a positioning chuck, is used to deposit a layer of fuel particles 530 on the base portion 560 (step 4) or on a layer of graphite (e.g., graphite spheres) formed on the base portion 560. In particular, the deposition apparatus 801 may include at least one deposition head 820 configured to pick up and control the placement of fuel particles 530 on graphite layers.

The deposition head 820 may use a variety or combination of techniques for picking up and holding fuel particles 530 include vacuum and electrostatic forces.

In an embodiment, the deposition head 820 may include a plurality of vacuum tubes 830 arranged in a particular pattern corresponding to a deposition pattern. In such an embodiment a vacuum is applied to the vacuum tubes 830 to pickup and hold the fuel particles 530 to the deposition head 820. Fuel particles may be released when pressed against a graphite layer by releasing the vacuum or applying pressure through the vacuum tubes 830. Such an embodiment deposition head 820 may be referred to as a "vacuum deposition head."

In some embodiments, one or more of the deposition heads 820 may use electrostatic forces to pick up and hold fuel particles, which may be referred to as an "electrostatic deposition head." Fuel particles 530 may be picked up by an electrostatic deposition head 820 by applying a voltage (positive or negative) to the head or particle-holding portions to attract fuel particles 530, such as into positioning pores as illustrated. The deposition heads 820 may be disposed over or pressed onto the base portion 560, and the charge applied to the deposition heads 820 may be neutralized or the polarity reversed to release the fuel particles 530 onto the graphite.

The deposition head 820 is pressed into the base portion 560 to imbed the fuel particles 530 into a layer of graphite formed on the base portion. As discussed above, this layer of graphite may be a layer of graphite powder, graphite spheres, or a combination of graphite powder and spheres that is applied over the base portion. After pressing the fuel particles 530 into the graphite layer, the vacuum is removed to release the fuel particles 530. After pressing, the fuel particles 530 are pressed into the base portion 560 and/or the graphite layer is compressed, using a roller 612, for example (step 5). In this manner, the lower fuel particle layer 532A is deposited.

The deposition apparatus 810 may include any number of the deposition heads 820. For example, the deposition apparatus 810 may include one deposition head 820 for each distinct pattern of fuel particles 530 in a fuel particle layer 532. In the alternative, the deposition apparatus 800 may include one or more arrays 840 of deposition heads 820, with the deposition heads 820 of each array having the same pattern, and different arrays having different patterns. Additionally or alternatively, the individual vacuum tubes may be actuated in order to vary the pattern of fuel particles picked up and applied in each layer in order to form a pattern. The deposition apparatus 800 may include actuators 850 to raise and lower the array 840.

Figure 9A:
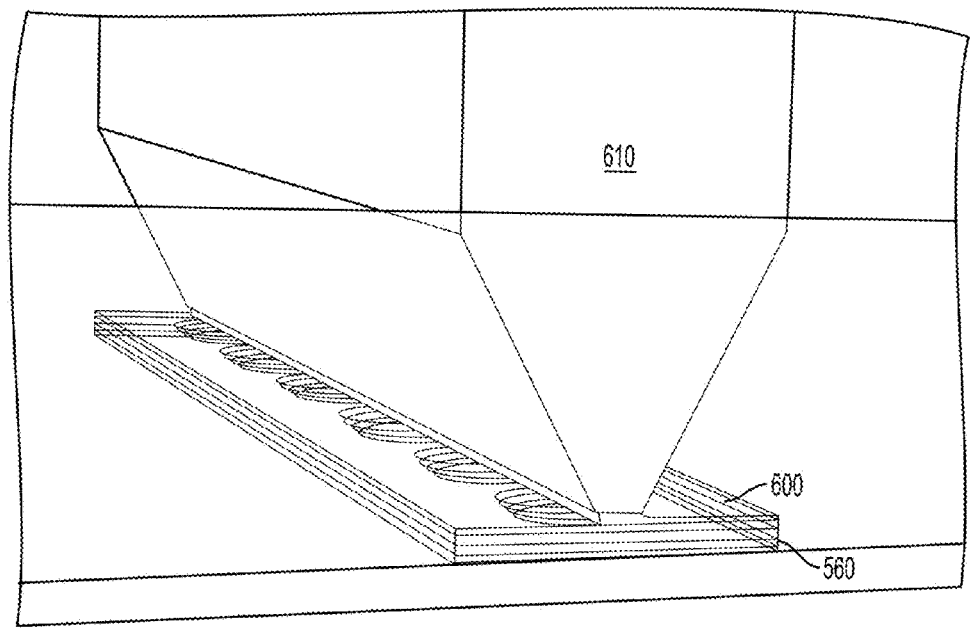
Figure 9B:
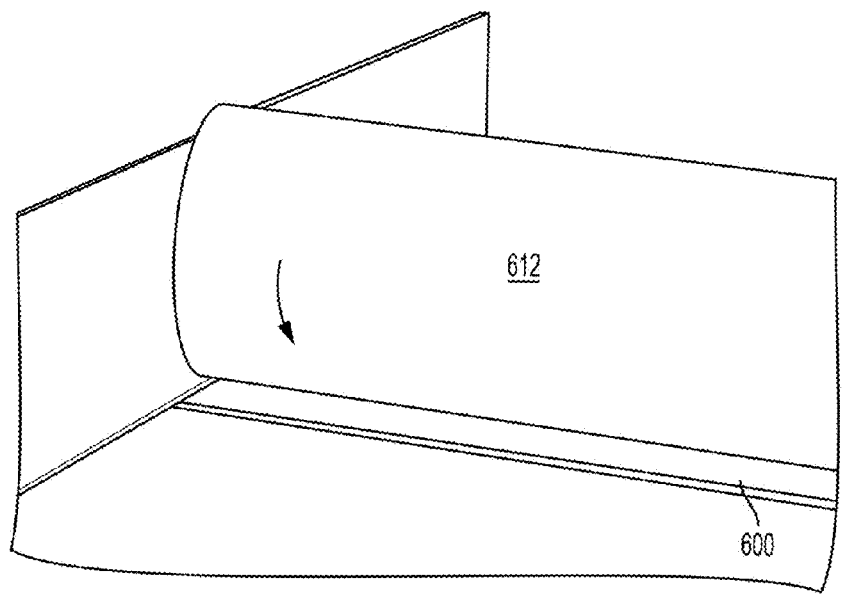
Figure 9C:
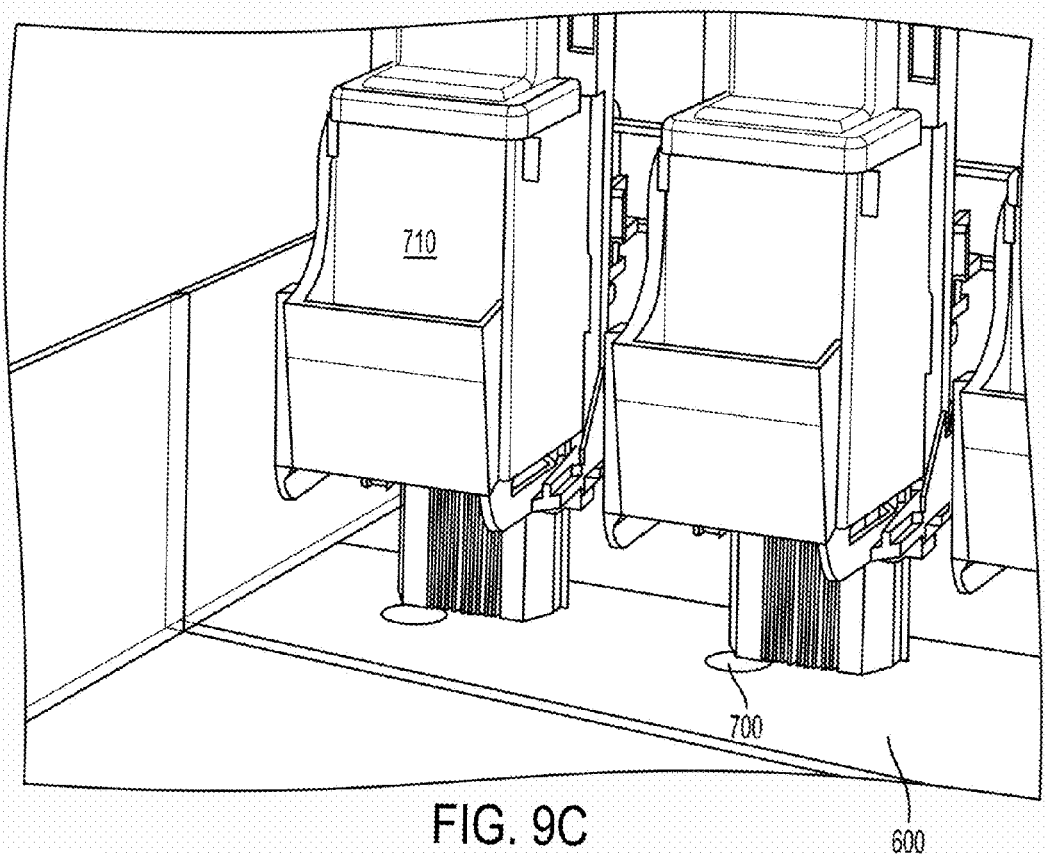

Once the layer of fuel particles 530 is deposited, the method proceeds to operation 30, as illustrated in FIGS. 6B, 9A, and 9B. In operation 30, a graphite layer 550 is formed by depositing graphite particles on the base portion 560. In particular, graphite particles are deposited to form a graphite layer 600 covering the fuel particles 530 (step 6). In particular, the graphite layer 600 may operate to fill holes formed by pressing the fuel particles 530 in step 5. The graphite layer 600 may be pressed (step 7). The binder 700 is then applied (step 8).

Operation 30 (steps 6-8) may be repeated multiple times in order to increase the thickness of the graphite layer 600, thereby forming a graphite layer 550 on the base portion 560. For example, operation 30 may be repeated from about 10 to 30 times, such as about 16 times. Therefore, the graphite layer 600 may have a thickness ranging from about 1 to 3 mm. As such, the graphite layer 550 may be thinner than the base portion 560.

In operation 40, the process may determine whether the fuel particle layer deposition is complete (i.e., whether additional fuel particle layers 532 remain to be deposited). If additional fuel particle layers 532 remain to be deposited, the method returns to operation 20 and additional fuel particle layers 532 and graphite layers 550 may be deposited. If no additional fuel particle layers 532 remain to be deposited, the method proceeds to operation 50. Operation 40 is optional as the process may be implemented such that the layers are performed in a defined manner obviating the need for a determination.

In operation 50, as shown in FIG. 6B, the cap portion 580 is formed. In particular, the cap portion 580 is formed by depositing a layer of graphite particles (step 9), pressing the graphite layer (step 10), and then depositing a binder (step 11), in a manner similar to operation 10 described above. Operation 50 (steps 9, 10, and 11) may also be repeated multiple times, as described for operation 10. As a result, the cap portion is formed.

Figure 10A:
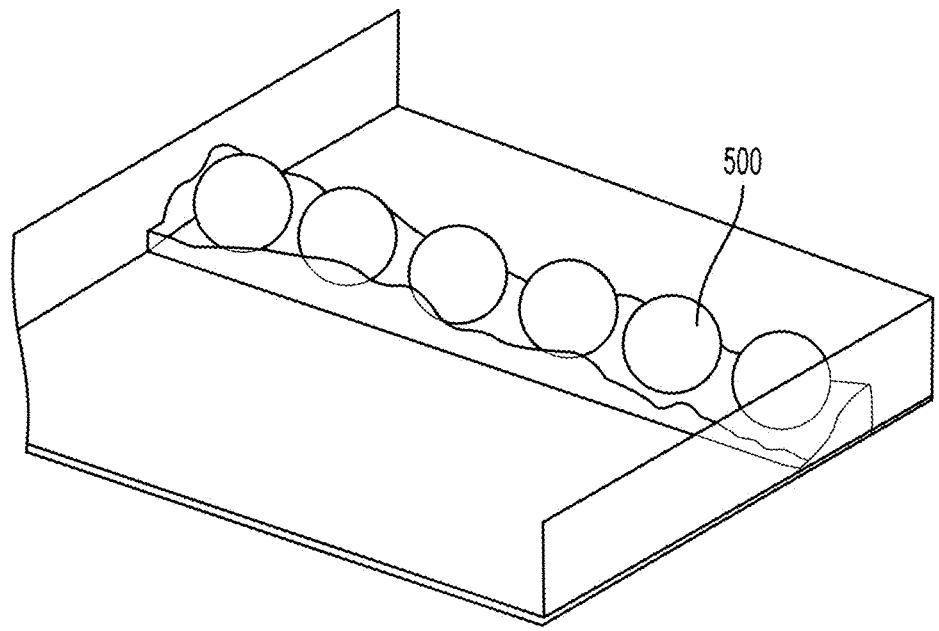
Figure 10B:
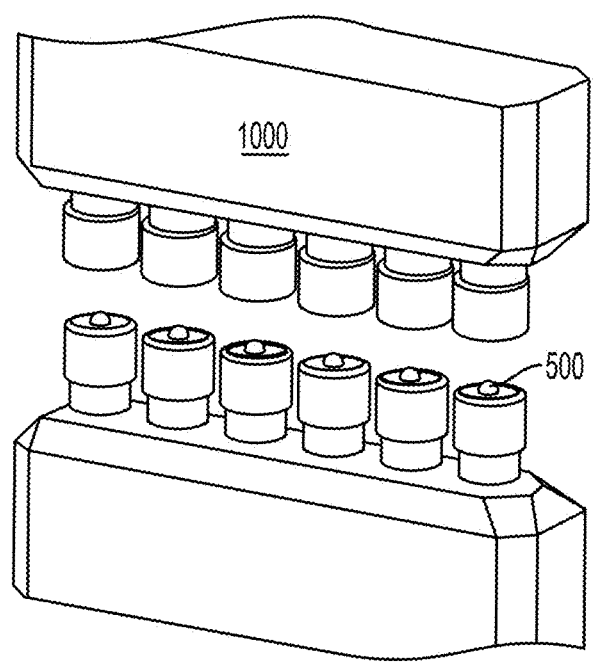

In operation 60 illustrated in FIGS. 6B, 10A, and 10B, loose graphite powder is removed (step 12), thereby exposing the fuel elements, e.g., fuel pebbles 500. The fuel elements are then processed in an isostatic press 1000 (step 13) that applies pressure to the fuel pellets 500. The isostatic pressing may result in a reduction in size of the fuel elements. For example, the diameter of the fuel pebbles 500 may be reduced from 6.5 cm to 6.0 cm by the isostatic pressing.

Figure 11:
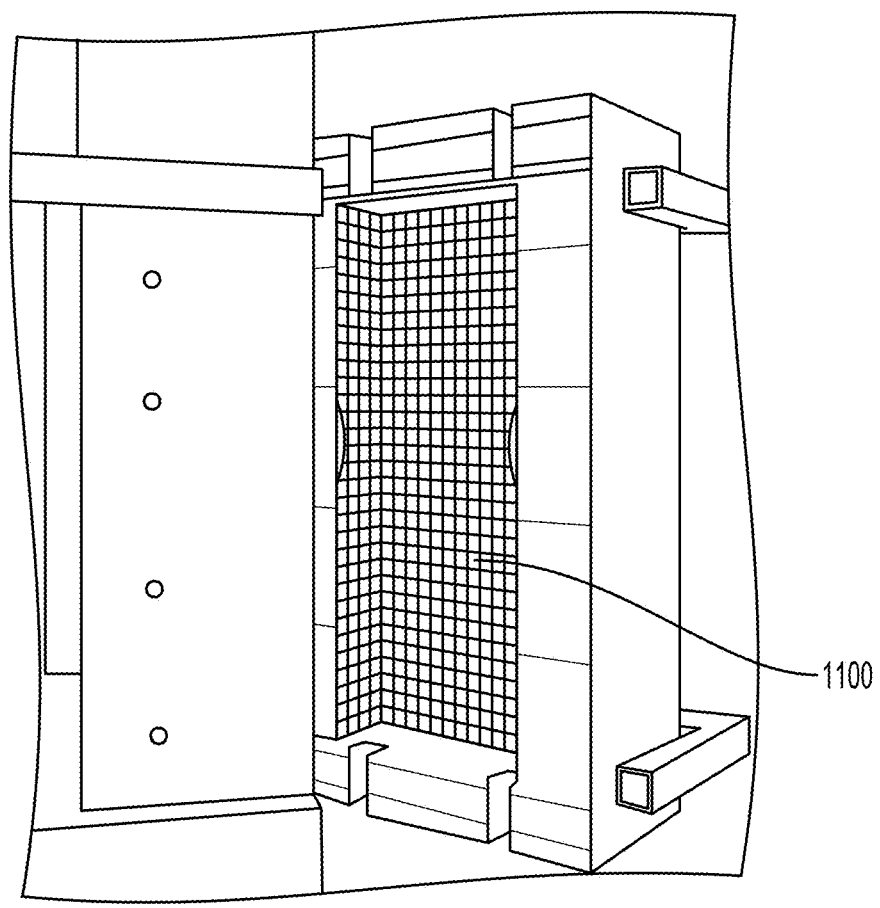

In operation 70 illustrated FIGS. 6B and 11, the fuel elements (e.g., fuel pebbles 500) are sintered in a high-temperature oven 1100 (step 14). The fuel elements may be sintered at a temperature ranging from 1900 to 2100° C., for example 2000° C. After sintering, the manufacturing process may be complete and the fuel elements may be ready for quality checks.

In some embodiments, a sintering binder may be applied to the fuel elements prior to sintering. In particular, a sintering binder may be mixed with the graphite powder or could be included in the binder 700. In other embodiments, the binder 700 may be a sintering binder.

In various embodiments, the binder 700 may be deposited via 3-D printing/additive manufacturing in steps 3, 8, and 11. In particular, the binder 700 may be deposited such that the fuel element may be formed in three dimensions, from the deposited graphite powder, in a layer-by-layer fashion. Again, using 3D printing/additive manufacturing to apply the binder and building up fuel elements in a layer-by-layer fashion enables the manufacturing process to form fuel elements in a variety of sizes and shapes (e.g., spherical as illustrated, ovoid, pill-shaped, prismatic, columnar, and conical) in the same manufacturing line. Some fuel elements may be manufactured using embodiment methods with interior passages for flowing coolant through the fuel element by not depositing graphite at the locations of the interior passages.

The foregoing description of the various embodiment manufacturing methods refers to fuel pebbles as an example of one form of fuel element that may be manufactured using the various embodiments. The various embodiments may be used to manufacture graphite fuel elements of any shape and configuration, including prismatic blocks, rods, pellets, etc. Thus, references to "fuel pebbles" is for ease of describing the manufacturing process and are not intended to limit the scope of the claims to the manufacture of fuel pebbles or spherical fuel elements unless specifically recited in the claims.

The number of layers and configurations of each layer may vary depending upon a variety of factors, including the density and/or amount of graphite deposited in each layer, the packing fraction of fuel within the fuel element, the shape of the fuel element being formed, etc. Thus, the description of various embodiment manufacturing operations and repetitions are not intended to limit the scope of the claims to a certain number of layers or operation cycles unless specifically recited in the claims.

In various embodiments, the manufacturing method may be implemented using robotics and 3D printing/additive manufacturing technology, and may be implemented by an automated process. Such an integrated process may provide for higher throughput, higher product quality, and better product consistency, as compared to conventional methods of manufacturing graphite-based nuclear fuel elements. Further, the method can be implemented to mass-produce fuel elements (e.g., fuel pebbles), such as by forming a production line of stages for each or a few operations and moving a plurality of fuel elements from stage to stage for parallel processing. Also, inspection operations may be added after each or selected ones of the operations described above to assess the quality of each applied layer, and control parameters of each operation may be adjusted in order to maintain a desired quality level or design tolerances for each layer and the fuel pebble as a whole.

Further, the manufacturing methods of the various embodiments enable fuel, poison and breeder particles to be placed in controlled positions within layers of the fuel elements so that the particles are spaced apart within fuel elements, which is an improvement over the randomly placed fuel particles of the conventional art. In particular, the manufacturing methods of the various embodiments enable manufacturing fuel elements with fuel particle packing structures that ensure that the fuel particles never contact one another.

Also, as noted above, the various embodiments eliminate the risk of two or more particles contacting each other during the application of high pressures involved in the final processes of manufacturing the fuel elements. As a result, the possibility of particles crushing one another during pressing is eliminated. Therefore, in contrast to conventional graphite fuel element forming techniques, the various embodiments enable the use of fuel particles that do not include an overcoat, such as the non-overcoated TRISO fuel particles described above. This eliminates a process step and cost of fuel particles, resulting in more efficient fuel element manufacturing.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the aspects and/or embodiments shown herein but is to be accorded the widest scope consistent with the following claims and the principles and novel features disclosed herein.

What is claimed is:

1. A method of manufacturing a nuclear fuel element configured for use in a high-temperature gas cooled reactor core, the method comprising:
   forming a graphite base portion of the fuel element;
   forming a fuel zone of the fuel element, comprising:
      forming a first graphite layer on the graphite base portion by depositing graphite powder on the base portion;
      depositing a first layer of particles in a predetermined pattern on the first graphite layer by controlling positioning of each particle within the first layer of particles;
      forming a second graphite layer on the first layer of particles by depositing graphite powder on the first layer of particles; and
      depositing a second layer of particles in a predetermined pattern on the second graphite layer by controlling positioning of each particle within the second layer of particles; and
   forming a graphite cap portion of the fuel element,
   wherein the particles in the first layer of particles and the second layer of particles comprise nuclear fuel particles.

2. The method of claim 1, wherein the particles in the first layer of particles and the second layer of particles further comprise burnable poison particles, breeder particles, or a combination thereof.

3. The method of claim 1, wherein:
forming a first graphite layer on the graphite base portion comprises depositing a mixture of graphite powder and graphite spheres; and
forming a second graphite layer on the first layer of particles comprises depositing a mixture of graphite powder and graphite spheres,
wherein the graphite spheres and the particles are similar in size.

4. The method of claim 1, wherein the particles in the first layer of particles and the second layer of particles comprise tri-structural-isotropic (TRISO) fuel particles that do not have an overcoat.

5. The method of claim 1,
wherein controlling positioning of each particle within the first layer of particles comprises positioning particles in the first layer of particles so that particles of the first layer of particles are spaced apart by substantially the same minimum distance, and
wherein controlling positioning of each particle within the second layer of particles comprises positioning particles in the second layer of particles so that adjacent particles of the second layer are spaced apart by substantially the same minimum distance.

6. The method of claim 1, wherein the second layer of graphite is formed on the first layer of particles so that the particles of the first layer of particles are separated from particles of the second layer of particles by substantially the same minimum distance.

7. The method of claim 1, wherein at least one of depositing the first layer of particles and depositing the second layer of particles comprises:
loading particles in controlled positions on a vacuum deposition head;
disposing the vacuum deposition head over the base portion or the first graphite layer;
releasing the particles from the vacuum deposition head; and
pressing the particles into the base portion or the first graphite layer.

8. The method of claim 1, wherein at least one of depositing the first layer of particles and depositing the second layer of particles comprises:
loading particles in controlled positions on an electrostatic deposition head;
disposing the electrostatic deposition head over the first graphite layer or the second graphite layer;
releasing the particles from the electrostatic deposition head; and
pressing the particles into the first graphite layer or the second graphite layer.

9. The method of claim 1, wherein at least one of forming the base portion and forming the cap portion, comprises:
A) depositing graphite;
B) pressing the graphite;
C) printing a binder on the pressed graphite; and
repeating operations A, B, and C to form at least one of the base portion and the cap portion.

10. The method of claim 9, wherein operations A, B, and C are repeated until at least one of the base portion and the cap portion has a thickness ranging from 3 mm to 12 mm.

11. The method of claim 9, wherein operations A, B, and C are repeated until at least one of the first graphite layer and the second graphite layer has a thickness ranging from about 1 mm to about 3 mm.

12. The method of claim 9, wherein operation C comprises printing the binder in a pattern having the same shape as a thin section of the fuel element.

13. The method of claim 1, wherein forming a first graphite layer and forming a second graphite layer comprises:
depositing one of graphite, graphite spheres, or a combination of graphite and graphite spheres to form the graphite layer;
pressing the graphite layer; and
printing a binder on the pressed layer.

14. The method of claim 1, wherein:
forming a first graphite layer on the graphite base portion comprises depositing graphite spheres; and
forming a second graphite layer on the first layer of particles comprises depositing graphite spheres,
wherein the graphite spheres and the particles are similar in size.

15. The method of claim 3, wherein depositing a mixture of graphite powder and graphite spheres comprises depositing graphite spheres in a central fuel zone portion and depositing graphite powder in a surrounding portion.

16. The method of claim 1, wherein:
the first layer of particles is disposed in a first plane;
the second layer of particles is disposed in a second plane that is substantially parallel to the first plane; and
the particles of the first layer do not overlap the particles of the second layer in a direction substantially perpendicular to the first and second planes.

17. The method of claim 1, wherein the fuel element is a spherical fuel pebble suitable for use in a pebble bed high temperature gas cooled reactor.

18. The method of claim 1, wherein:
the first layer of particles is disposed in a first plane;
the second layer of particles is disposed in a second plane that is substantially parallel to the first plane; and
the first layer of particles is separated from the second layer of particles by the second graphite layer.

* * * * *